1-341 AU 332 EX
/9/84 OR RE 31,700

United States Patent [19]
Yamaguchi

[11] E Patent Number: Re. 31,700
[45] Reissued Date of Patent: Oct. 9, 1984

[54] CIGARETTE FILTER

[76] Inventor: Takeyoshi Yamaguchi, 20-24, Tsurumaki 5-chome, Setagaya-ku, Tokyo 154, Japan

[21] Appl. No.: 445,771

[22] Filed: Nov. 30, 1982

Related U.S. Patent Documents

Reissue of:
[64] Patent No.: 4,269,204
Issued: May 26, 1981
Appl. No.: 65,533
Filed: Aug. 10, 1979

[30] Foreign Application Priority Data

Oct. 13, 1978 [JP] Japan ..... 53-125083

[51] Int. Cl.[3] ..... A24B 15/00
[52] U.S. Cl. ..... 131/341; 131/331
[58] Field of Search ..... 131/341, 331

[56] References Cited

U.S. PATENT DOCUMENTS 2,372,437 3/1945 Lethrop et al. ..... 131/341
3,428,551 2/1969 Dawe ..... 131/341
4,121,599 10/1978 Newton et al. ..... 131/341

OTHER PUBLICATIONS

"Cigarette Search", *Wall Street Journal*, Wise, Jul. 9, 1954.

*Primary Examiner*—V. Millin
*Attorney, Agent, or Firm*—Blum, Kaplan, Friedman, Silberman & Beran

[57] ABSTRACT

An improved cigaret filter wherein dry and active green algae in the form of chlorella in a granular or powdery form which can physically trap and remove such toxic substances contained in cigaret smoke as nicotine, tar, carbon monoxide and the like and, additionally, can biologically denature and change these substances to harmless form are carried or held by a carrier comprising a fibrous, continuous-cellular formed or the like member. The filter is used as combined with a cigaret holder or directly with a cigaret. With each carrier, preferably, a total weight of 20 to 50 mg. of granular or powdery chlorella is used alone or as combined with such inorganic porous adsorbent as fine granular or powdery zeolite, silica gel, iron oxide or activated charcoal.

12 Claims, 4 Drawing Figures

CIGARETTE FILTER

Matter enclosed in heavy brackets [ ] appears in the original patent but forms no part of this reissue specification; matter printed in italics indicates the additions made by reissue.

This invention relates to cigaret filters and, more particularly, to improvements in the filter to be used as combined with a cigaret or cigaret holder to trap and remove toxic substances contained in smoke at the time of smoking.

It is generally known that various substances detrimental to human bodies such as, generally, (1) nicotine, (2) tar, (3) carbon monoxide, (4) imperfect combustion products containing carcinogenic matters, and the like are contained in cigaret smoke. For nicotine, for example, it is said that 20 to 25 mg. of nicotine are contained usually in one cigaret and that about 3 mg. of nicotine are absorbed into the lung of a smoker in one smoking. Therefore, in order to trap such toxic substances in smoking, there has been taken a measure wherein a filter made of fibrous material of cotton, synthetic resin or glass, or made of a continuous cellular foamed plastic or the like is used as arranged at an end of a cigaret, alone or as combined with granular or powdery activated carbon or within a cigaret holder as combined with water with which the filter is impregnated. However, such filter used alone or as combined as above is preferably of such density as will not remarkably obstruct the flow of smoke. Therefore, there can be toxic substances which are carried into the body of the smoker without contacting the filter-forming member and any material combined with it. Further, in such conventional measures, the trapping of toxic substances depends solely on such physical actions as the deposition of those substances on the filter-forming member or the like and the dissolving in the impregnating water and, therefore, the toxic substances having passed through the filter are carried as they are into the human body. Particularly, it has been entirely impossible to trap carbon monoxide which is gaseous by means of such physical action only and, with the conventional filter, no countermeasure can be taken against the carcinogenic matters carried into the human body through the filter mostly together with tar. The present invention has been suggested to eliminate such defects of the conventional cigaret filters.

According to the present invention, an improved cigaret filter comprises at least dry and active green algae in a form of chlorella incorporated in a porous columnar carrier carrying said green algae and capable of trapping toxic substances in the cigaret smoke as deposited on the carrier while allowing the smoke to pass therethrough, so that the toxic substances will contact the chlorella to be physically absorbed and trapped in its pores and to biologically react with the chlorella so as to be denatured into harmless substances.

A primary object of the present invention is, therefore, to provide an improved cigaret filter which can act to not only physically trap but also biologically denature toxic substances in cigaret smoke.

Other objects and advantages of the present invention will be made clear upon reading the following explanation of the invention detailed with reference to accompanying drawings, in which.

While the present invention shall be described in detail with reference to the illustrated aspects, it should be understood that the intention is not to limit the invention to these aspects but is to include all modifications and equivalents arrangements possible within the scope of appended claims.

Chlorella which has been recently extensively used to maintain or improve the human health is a single cellular alga and typical of green algae or, in other term, chlorophyceae, and *Chlorella pyrenoidosa, Chlorella ellipsoidea* and *Chlorella vulgaris* are known as species of the same genus. Particularly, about half of alga substances of chlorella is high quality proteins including many kinds of amino acids, enzymes and carbohydrates. On the other hand, nicotine of the toxic substances in the cigaret smoke is an alkaloid which is a basic vegetable substance belonging to a nitrogenous compound and is, therefore, considered to easily react or co-act with such various substances as proteins of chlorella which is a nitrogenous compound. Further, tar is also a carbohydrate and can be, therefore, considered to act with such chlorella substances. In the same manner, carbon monoxide which has not been able to be trapped or denatured at all in the conventional measures by the physical depositing or dissolving action is expected to give certain reaction or action particularly when such organic substances of chlorella as above are heated by cigaret smoke. The so-called carcinogenic matters are contained mostly in tar. Therefore, it is evident that the rate of removal of the carcinogenic matters is higher with the capacity of trapping and denaturing tar. The mechanism of the biological action of such algae as chlorella expected to have such effects on the cigaret's toxic substances must be elucidated by future investigations. However, the later described test results prove that such action exists and has a remarkable effect of removing the toxic substances. The dry and active chlorella usually available in the market is highly porous having a number of very fine pores in either case when it is granular or powdery so that the rate of contact of it with the passing cigaret smoke is as high as that of the conventionally used activated granular charcoal and its capacity of physically trapping the toxic substances is also high. It is evident, therefore, that the multiplied action of the biologically trapping or denaturing capacity and physically trapping capacity is obtained by the green algae in the form of chlorella. In the present invention, chlorella is utilized to trap and remove the toxic substances in cigaret smoke employing a conventionally used filter means of, for example, a fibrous member or foamed member as a carrier.

Figure 1:
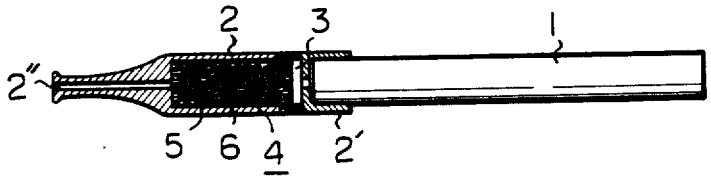
FIG. 1 is a vertically sectioned view of a combination of a generally used cigaret holder and a cigaret filter in an aspect of the present invention.

In FIG. 1 showing the case where a cigaret filter according to the present invention is used as combined with an ordinary cigaret holder, a cigaret 1 is inserted and held at one end in a cigaret holding end 2' of a holder 2 and an inner chamber 3 communicating respectively with said holding end 2' and a small diameter conduit 2'' at the other end as a mouthpiece is charged with a filter 4 according to the present invention. In this case, granular or powdery green chlorella 5 is substantially uniformly dispersed and carried within a columnar carrier 6 consisting of a fibrous member of cotton, such synthetic resin as acetate or glass, or of a continuous cellular foamed plastic.

Figure 2:
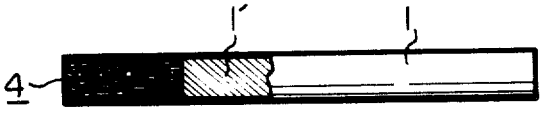
FIG. 2 is a vertically sectioned view of a cigaret filter directly associated with a cigaret in another aspect of the present invention.

In FIG. 2 of another aspect wherein the filter 4 formed in the same manner as in the case of FIG. 1 is associated as directly connected to one end with the cigaret 1, the filter 4 is in contact with a layer 1' of tobacco leaves forming the cigaret and is made integral with the cigaret by a winding paper of the cigaret 1 or another paper wound continuous to the winding paper.

Figure 3:
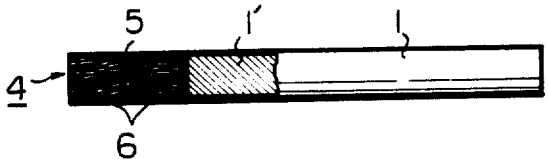
FIG. 3 is a vertically sectioned view of a cigaret filter also associated with a cigaret in still another aspect of the present invention.

In FIG. 3 showing the case where the filter 4 is associated directly with the cigaret 1 as in the case of FIG. 2, the filter 4 of the present invention particularly comprises granular green chlorella 5 carried as one layer between a pair of columnar carriers 6 of the material explained with reference to FIG. 1. The chlorella 5 may be held between the respective carriers 6 of the pair as they are or, alternatively, as wrapped columnarly to be of subsantially the same diameter as of the carrier 6 with a thin paper or the like material high in air-permeability.

Figure 4:
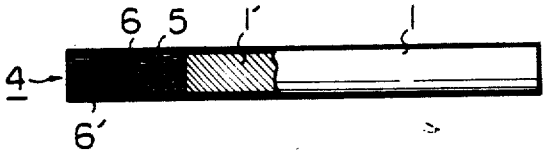
FIG. 4 is a vertically sectioned view of a cigaret filter in a still further aspect of the present invention as associated with a cigaret.

In still another aspect shown in FIG. 4, the filter 4 combined directly with the cigaret 1 consists of the carrier 6 carrying the chlorella 5 as substantially uniformly dispersed the same as in the case of FIGS. 1 or 2 and arranged in direct contact with the tobacco leaf layer 1' and another filter layer 6' only of a fibrous or foamed member containing no chlorella. As this layer 6' is made a mouthpiece, the chlorella will be prevented from dropping off the carrier.

In any one of the foregoing aspects, the chlorella used as carried or retained by the carrier 6 may be used independently or, alternatively, together with such inorganic adsorbent as generally used activated charcoal or zeolite having uniform pores and known as an adsorbent. In such case, the physically trapping capacity of such inorganic adsorbent will be elevated and the effect of the biologically trapping and denaturing actions expected mostly from such algae as chlorella will be also increased.

In order to investigate effects of the thus obtained cigaret filter of the present invention in removing the toxic substances except carbon monoxide gas, tests have been made in the following manner. Marketed plain cigaret "Peace" produced and sold by Japan Monopoly Corporation has been used as cigarets to be tested. The cigaret is held in a cigaret holder charged with a cigaret filter according to the present invention of the formation shown in FIGS. 1 or 2. The holder is connected at the exhausting end to a Cambridge filter holder having therein a collecting filter which is used extensively for this kind of test. The filter holder is connected at the exhausting end to an aspirator which utilizing, for example, a water flow. When water is passed through the aspirator and the cigaret is lighted, a negative pressure is caused within the aspirator, whereby the cigaret will be burned as if the same is smoked, so that the smoke will be passed through the cigaret filter of the present invention, then led to the collecting filter having a collecting capacity of 0.1$\mu$, and exhausted through an exhaust port of the aspirator. After one "Peace" cigaret is burned, the collecting filter is taken out of the Cambridge holder, the collected substances are separated from the collecting filer and compositions of the thus separated substances are analyzed by a chromatography technique in a known manner.

The cigaret filter of the present invention used in the test comprises a carrier formed of, similarly to generally used cigaret filter, acetate fibers in a columnar shape of 8×20 mm. and a mixture of 30 mg. of granular chlorella in dry and active form and 20 mg. of adsorbent consisting of powdery iron oxide and granular activated charcoal which is used usually for cigaret filters, the mixture being carried as uniformly dispersed within said carrier. Amounts of nicotine, tar and 3,4-benzpyrene contained in the cigaret smoke after passing through the cigaret filter according to the present invention and collected by the collecting filter are shown in Table 1, in which Sample 1 shows the case that, for comparison, no cigaret filter is used, Sample 2 shows the case that a cigaret filter of the present invention containing chlorella is used, and Sample 3 shows also the case that, for comparison, a so-called aquafilter in which the above referred carrier containing no chlorella but impregnated with 0.2 cc of plain water is used.

TABLE 1

| Sample | Nicotine (mg.) | Tar (mg.) | 3,4-benzpyrene (mg.) |
|---|---|---|---|
| 1 | 2.180 | 16.5 | 7.6 |
| 2 | 0.430 | 4.3 | 0 |
| 3 | 0.350 | 13.8 | 7.6 |

(Test results by Japan Food Hygiene Association, a testing and analyzing authority appointed by the Minister of Health and Welfare in Japan.)

3,4-benzpyren is known as the most remarkable cause of a lung cancer among some benzypyrene known as carcinogenic matters contained in tar of cigarets. In the case of Sample 2, its detected amount is not always absolutely zero but tar is trapped so much by the cigaret filter of the present invention that the amount of 3,4-benzpyrene contained in the tar reduced to be of a very small amount is considered to be substantially equal to zero.

Now, the test results of investigating carbon monoxide gas removing capacity of the cigaret filter of the present invention for cigarets of different brands made by means of a gas chromatography technique are shown in Table 2, in which the numerical values are CO gas concentrations in the cigaret smoke in the case of using no cigaret filter and in the case of passing the smoke through the cigaret filter of the present invention which is the same as used in the tests of Table 1. The tests with the cigaret filter of the present invention were made with respect to a plurality of cigarets of the respective brands.

TABLE 2

| Cigaret Brand | No cigaret filter (p.p.m.) | Using the cigaret filter of the present invention (p.p.m.) |
|---|---|---|
| PEACE (Japan) | About 1,000 | 200–400 |
| Marlboro (U.S.A.) | About 1,000 | 250–400 |
| M.S. (Italy) | About −400 | 100–200 |

(Test results by the Japan Food Hygiene Association.)

The concentration of the CO gas remaining in the smoke after passing through the cigaret filter of the present invention is seen to vary depending on the cigarets of the respective brands, because it is thought that, even if the tobacco leaves forming the cigarets of the respective brands are of the same kind and composition, when the origin of the tobacco leaves of each cigaret is different, its composition will be different. Anyhow, it is proved by the above tests that about 50 to 80% CO gas is practically removed by the cigaret filter containing chlorella of the present invention.

In the above described tests, a mixed adsorbent of powdery iron oxide and granular activated charcoal is used as mixed with the granular chlorella but, other than activated charcoal and iron oxide, such inorganic porous adsorbent as zeolite, silica gel and the like can be used. The dry and active green algae represented by chlorella may be used independently as carried by the carrier, without any inorganic adsorbent. However, in view of the effect of the multiplied action of the capacity of biologically denaturing the toxic substances mainly by the algae and the capacity of physically trapping them mainly by the inorganic adsorbent, it is considered preferable to use algae together with any of such adsorbents or with a proper combination of them.

While the amount of algae or a mixture of algae with an inorganic adsorbent to be used should vary between the case of repeatedly using the cigaret filter as combined with the cigaret holder and the case of using the filter only once as combined directly with the cigaret, it is preferable to keep the total amount within the range of about 20 to 50 mg. The porportion of the adsorbent to the algae is preferably made about 50% at most.

What is claimed is:

1. A cigaret filter comprising *an effective amount of* dry and active green algae in the form of chlorella incorporated in a columnar carrier of porous material for trapping toxic substances in cigaret smoke while allowing said smoke to pass through the carrier [, said chlorella being of an amount in the range of about 20 to 50 mg. for said carrier of 8×20 mm].

2. A cigaret filter according to claim 1 wherein said chlorella is granular.

3. A cigaret filter according to claim 1 wherein said chlorella is powdery.

4. A cigaret filter according to claim 1 wherein said chlorella is held between a pair of said carriers.

5. A cigaret filter according to claim 4 wherein said chlorella is enclosed with an air-permeable material.

6. A cigaret filter comprising *an effective amount of* granular dry and active chlorella and a granular inorganic porous adsorbent incorporated in a columnar carrier for trapping toxic substances in cigaret smoke while allowing said smoke to pass therethrough [, said chlorella being of an amount in the range of about 20 to 50 mg. for said carrier of 8×20 mm].

7. A cigaret filter according to claim 6 wherein said adsorbent is at least one selected from the group consisting of zeolite, silica gel, iron oxide and activated charcoal.

8. A cigaret filter according to claim 6 wherein said adsorbent is present in a quantity of no more than 50% of the amount of said chlorella.

*9. A cigaret filter according to claim 1, wherein the amount of said dry and active green algae is in the range of about 20 to 50 mg.*

*10. A cigaret filter according to claim 9, wherein said columnar carrier is about 8×20 mm.*

*11. A cigaret filter according to claim 6, wherein the amount of said granular dry and active chlorella is in the range of about 20 to 50 mg.*

*12. A cigaret filter according to claim 11, wherein said columnar carrier is about 8×20 mm.*

* * * * *